June 8, 1954 M. B. COLE 2,680,533
ENCLOSURE MOUNTING DEVICE
Filed Feb. 24, 1950
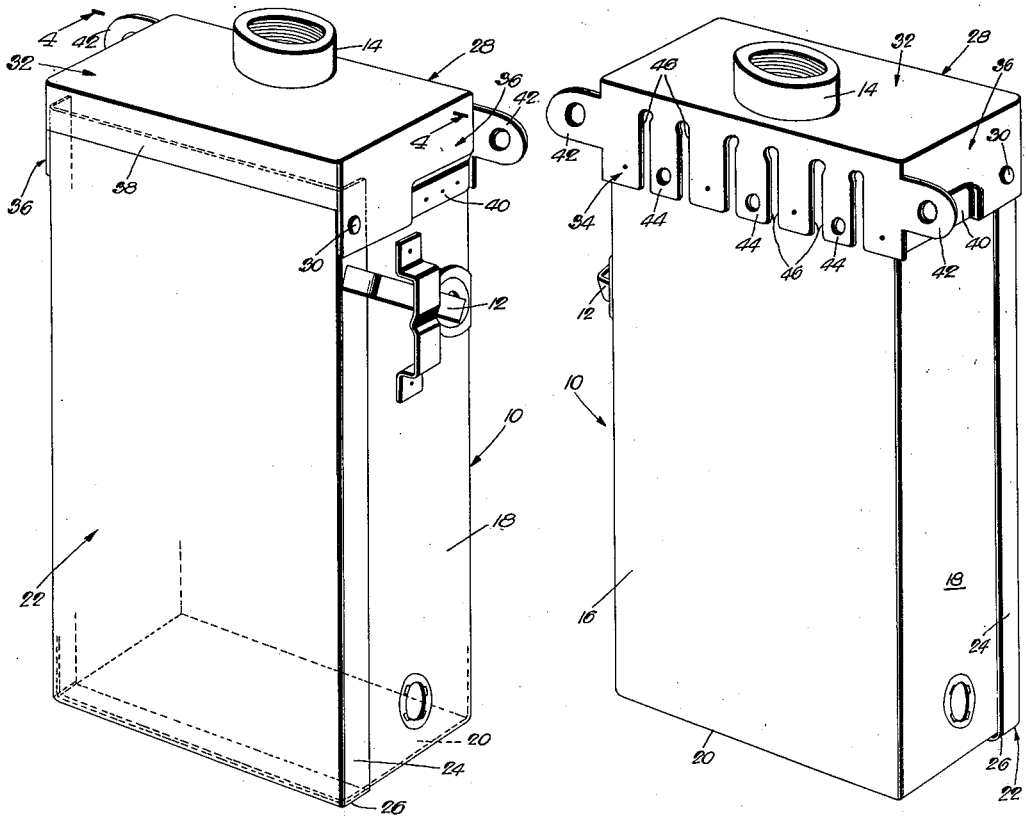
INVENTOR.
Melvin B. Cole
BY Edwin Levisohn +
Harry Cole
Attorneys.

Patented June 8, 1954

2,680,533

UNITED STATES PATENT OFFICE 2,680,533

ENCLOSURE MOUNTING DEVICE

Melvin B. Cole, River Edge, N. J., assignor to Federal Electric Products Company, Newark, N. J., a corporation Application February 24, 1950, Serial No. 145,973

8 Claims. (Cl. 220—18)

The present invention relates to enclosures provided with mounting devices therefor.

The primary object of the present invention is to provide an enclosure with a plurality of sets of mounting elements which may be used selectively to suit different requirements determined by the lateral dimension of the space on the support for the enclosure. More specifically, pursuant to the present invention, the enclosure as produced by the manufacturer and supplied to the customer is provided with a pair of laterally projecting elements for securing the enclosure to the support on which the enclosure is mounted, and said enclosure as thus supplied to the customer is also provided with a set of mounting elements which are normally in inoperative position but which can be easily disposed in operative position for use in lieu of said first mentioned set of elements when the available space on the support is not sufficiently wide to enable said first set of elements to be used, and said first set of elements are so constructed and arranged that they can be easily disposed in positions lying close to the adjacent sides, respectively, of the enclosure instead of projecting therefrom.

The above object of the invention and objects ancillary thereto will be fully understood from the following description considered in connection with the accompanying illustrative drawings.

In the drawings:

Fig. 1 is a front perspective view of an enclosure, here shown as a switch box, embodying the present invention;

Fig. 2 is a rear perspective view of the enclosure;

Fig. 3 is a rear perspective view of the upper part of the enclosure showing the different sets of mounting elements in positions different from the positions of said sets of elements, respectively, illustrated in Figs. 1 and 2; and Fig. 4 is a fragmentary sectional view on the line 4—4 of Fig. 1.

Referring now to the drawings in detail, the invention is illustrated as embodied in a switch box 10 which is ordinarily made of sheet metal. The handle for operating the switch, which is enclosed within the box, is indicated at 12. Said box is provided with an internally threaded collar 14 to receive the end of the wire conduit and, as usual, a plurality of knock-outs are formed in several walls of the box for wiring, as will be readily understood. As usual, the box comprises a rear wall 16, side walls 18 and a bottom wall 20. The box is provided with a front closure 22 having side flanges 24 which abut adjacent side walls, respectively, of the box and a bottom flange 26 which abuts the bottom wall 20 of the box. Said cover 22 is hinged to the top part 28 of the box in any suitable way as by the pivot studs 30.

The top part or cap 28 of the box is formed in one piece, ordinarily from sheet steel, and comprises the wall 32 which forms the top of the box, a rear portion 34 which is welded or otherwise suitably secured to the upper part of the rear wall 16 of the box, the side portions 36 which are welded or otherwise suitably secured to the upper parts of the adjacent side walls 18, respectively, of the box, and a front flange 38 which overlies the upper marginal edge portion of the cover 22 in the closed position of the latter. It will be noted that parts 40 of the end portions 36 of the top 28 of the box are pressed inwardly so as to space the remaining part of said portions 36 sufficiently from the outer surfaces of walls 18 to accommodate the flanges 24 of the cover 22 so that the latter may be moved to its open and closed positions. The securement of top 28 to the box is here shown as constituted by the welding of the inwardly pressed portions 40 to the side walls 18 and by the spot welding of said rear part 34 to the rear wall 16 of the box.

Pursuant to the above stated primary object of the present invention, the top part 28 of the box is provided with the integral apertured ears 42 which, as shown in Figs. 1 and 2, normally lie in the plane of portion 34 and project laterally beyond the adjacent side walls 18, respectively, of the box, and said part 34 is also provided with a plurality of embryo apertured ears 44 which normally lie, in inoperative or inactive positions, in the plane of said part 34 in abutting relation with the outer surface of wall 16 of the box. It will be observed that the embryo ears 44 are formed by providing slots 46 between the adjacent portions which are welded to said wall 16. Thus, as illustrated by Fig. 3 in comparison with Fig. 2, the ears 44 which are shown in their inactive positions in Fig. 2, can be bent upwardly out of the plane of part 34 to operative positions for use in mounting the box on the support. Fig. 3 shows only two of the ears 44 bent up into operative position, but it will be understood that the other ear 44 can also be bent up into operative position if desired. Ordinarily, when it is desired to use ears 44, ears 42 are bent from their projected positions illustrated in Fig. 2 to the positions illustrated in Fig. 3 where they lie close to or abut the end portions 36 of member 28.

In practicing the present invention, the box as produced by the manufacturer is in the form illustrated by Fig. 2, wherein the ears 42 project beyond the opposite side walls of the box, and with the ears 44 in their inactive positions abutting the rear wall 16 of the box, i. e., in the plane of part 34. In the event, however, that the space on the support for mounting the box is narrower than that necessary to enable the laterally projecting ears 42 to be used, for securing the box to the support, said ears 42 are bent down against the end portions 36 of the box, and two or three of the embryo ears 44 are bent up into the positions illustrated in Fig. 3 for use in securing the box to the support. The bending up of the ears 44 from part 34 can be easily accomplished by prying up said ears away from the back of the box, by means of a screw driver or other suitable tool, and then hammered flat in the vertical positions illustrated in Fig. 3.

The switch box illustrated is of the type known as a rain-tight enclosure, being usually mounted outdoors, and it will be noted that the present invention does not in any respect impair this character of the enclosure.

It will be understood that various changes in the details of construction may be made and that the invention may be applied to enclosures other than those used for switches or other electrical instrumentalities, without departing from the underlying idea or principles of this invention within the scope of the appended claims.

Having thus described my invention, what I claim and desire to secure by Letters Patent, is:

1. An enclosure having means projecting beyond the opposite sides, respectively, of the enclosure for mounting the enclosure on a support therefor, said enclosure also having additional mounting means integral with said first mentioned mounting means and disposed normally against the back of the enclosure between the opposite sides thereof and projectable beyond the top of the enclosure for mounting the latter on a support which is not wide enough to accommodate said first mentioned mounting means.

2. An enclosure having means projecting beyond the opposite sides, respectively, of the enclosure for mounting the enclosure on a support therefor, said enclosure also having additional mounting means disposed normally against the back of the enclosure between the opposite sides thereof and projectable beyond an end wall of the enclosure for mounting the latter on a support which is not wide enough to accommodate said first mentioned mounting means, said enclosure having a part overlying the back of the enclosure and provided with bendable portions which constitute said additional mounting means, said overlying part having portions projecting beyond the opposite sides of the enclosure and constituting said first mentioned mounting means.

3. An enclosure having means projecting beyond the opposite sides, respectively, of the enclosure for mounting the enclosure on a support therefor, said enclosure also having additional mounting means disposed normally against the back of the enclosure between the opposite sides thereof and projectable beyond the top of the enclosure for mounting the latter on a support which is not wide enough to accommodate said first mentioned mounting means, said enclosure having a top wall and the latter having an integral part overlying the back of the enclosure and provided with bendable portions which constitute said additional mounting means, said overlying part having portions projecting beyond the opposite sides of the enclosure and constituting said first mentioned mounting means.

4. In an enclosure having a wall, means carried by the enclosure and overlying said wall for mounting said enclosure on a support, said means including a plurality of bendable parts which are bendably movable from inactive positions in which they lie against said wall of the enclosure to operative positions in which they project beyond said wall and an integral part overlying said wall, said integral part being slotted to form said bendably movable parts, said integral part projecting beyond the enclosure to provide additional means for mounting the enclosure.

5. In an enclosure having a wall, means on said wall for mounting said enclosure on a support, said means comprising a plurality of bendable parts which are bendably movable from inactive positions in which they lie against said wall of the enclosure to operative positions in which they project beyond said wall, said enclosure having a top wall provided with an integral part overlying said first mentioned wall, said integral part being slotted to form said bendably movable parts, said integral part projecting beyond the enclosure and terminating in apertured ears providing additional means for mounting the enclosure.

6. An enclosure having a rear wall, side walls and a bottom wall, a top member having side, rear and front flanges closing the top of the enclosure, a front cover for said enclosure hinged to the side flanges of said top member and overlapped, in the closed position of the cover, by said front flange, said rear flange having portions which are bendable from positions in which they lie against the rear wall of the enclosure to positions in which they project upwardly beyond said top member to provide means for mounting the enclosure on a support, said rear flange having portions projecting beyond said side walls and providing additional means for mounting the enclosure.

7. An enclosure having a rear wall, a front opening defined in said enclosure and a cover carried thereby for said front opening, mounting means provided on the rear of said enclosure and extending widthwise thereof beyond the widthwise dimension of said cover, and additional mounting means at the rear of said enclosure projectable from a normal position overlying said rear wall to an extended position beyond the longitudinal extent of said cover in the disposition of the latter for covering said opening.

8. An enclosure having a rear wall, a front opening defined in said enclosure and a cover carried thereby for said front opening, mounting means provided on the rear of said enclosure and extending widthwise thereof beyond the widthwise dimension of said cover, and additional mounting means at the rear of said enclosure projectable from a normal position overlying said rear wall to an extended position beyond the longitudinal extent of said cover in the disposition of the latter for covering said opening, said enclosure being provided with an end wall, both said first mentioned and said additional mounting means being provided on said end wall, and the latter having provision to mount said cover.

(References on following page)

References Cited in the file of this patent

UNITED STATES PATENTS

| Number | Name | Date |
|---|---|---|
| 537,613 | Lucas | Apr. 16, 1895 |
| 725,822 | Bunch | Apr. 21, 1903 |
| 1,257,375 | Meacham | Feb. 26, 1918 |
| 1,258,144 | Reeve | Mar. 5, 1918 |
| 1,456,711 | Peterson | May 29, 1923 |
| 2,330,975 | Jackson | Oct. 5, 1943 |
| 2,339,336 | Hoffman et al. | Jan. 18, 1944 |
| 2,380,782 | Owens | July 31, 1945 |
| 2,556,061 | Buckels | June 5, 1951 |

FOREIGN PATENTS

| Number | Country | Date |
|---|---|---|
| 451,036 | Great Britain | July 29, 1936 |
| 195,110 | Switzerland | Jan. 15, 1938 |
| 64,143 | Norway | Nov. 10, 1941 |